US011957151B2

(12) United States Patent
    Van De Braak

(10) Patent No.: US 11,957,151 B2
(45) Date of Patent: Apr. 16, 2024

(54) DEVICE FOR PROCESSING PINEAPPLES

(71) Applicant: DUTCH FOOD TECHNOLOGY B.V., Roermond (NL)

(72) Inventor: Pierre Van De Braak, Roermond (NL)

(73) Assignee: DUTCH FOOD TECHNOLOGY B.V. (NL)

( * ) Notice: Subject to any disclaimer, the term of this patent is extended or adjusted under 35 U.S.C. 154(b) by 322 days.

(21) Appl. No.: 17/274,569

(22) PCT Filed: Sep. 10, 2018

(86) PCT No.: PCT/NL2018/050584
    § 371 (c)(1),
    (2) Date: Mar. 9, 2021

(87) PCT Pub. No.: WO2020/055232
    PCT Pub. Date: Mar. 19, 2020

(65) Prior Publication Data
    US 2022/0046973 A1      Feb. 17, 2022

(51) Int. Cl.
    *A23N 4/20*     (2006.01)
    *A23N 7/00*     (2006.01)

(52) U.S. Cl.
    CPC .............. *A23N 4/20* (2013.01); *A23N 7/002* (2013.01)

(58) Field of Classification Search
    CPC .................................. A23N 4/20; A23N 7/002
    USPC ........................................................... 99/542
    See application file for complete search history.

(56) References Cited

U.S. PATENT DOCUMENTS

| | | | |
|---|---|---|---|
| 4,509,157 A | * | 4/1985 | Morinaga ............ G11B 17/032 |
| 4,834,795 A | | 5/1989 | Raub et al. |
| 2006/0288881 A1 | | 12/2006 | Ascari et al. |

FOREIGN PATENT DOCUMENTS

| | | |
|---|---|---|
| DE | 202014104819 U1 | 10/2014 |
| DE | 102014013454 B3 | 7/2015 |
| WO | 2013036110 A1 | 3/2013 |
| WO | WO2013036110 * | 3/2013 |
| WO | 2014184298 A1 | 11/2014 |

OTHER PUBLICATIONS

International Search Report and Written Opinion dated May 28, 2019 issued in corresponding PCT Appln. No. PCT/NL2018/050584.

* cited by examiner

Primary Examiner — Dana Ross
Assistant Examiner — Joseph W Iskra
(74) Attorney, Agent, or Firm — Carter, DeLuca & Farrell LLP

(57) ABSTRACT

The present disclosure relates to a device (10) for processing pineapples comprising at least one carrier (7) for carrying a pineapple to be processed, and at least one processing unit for removing the outer ends from the pineapple (3) and/or for coring and peeling the pineapple (5). The at least one carrier (7) and the least one processing unit are located inside a housing (50) of the device (10). The housing (50) comprises an entrance (54), wherein the device (10) further comprises a pineapple introduction mechanism (52) configured for automatically introducing the pineapple to be processed in the housing (50) through the entrance (54) in the at least one carrier (7) inside the housing (50).

20 Claims, 3 Drawing Sheets

DEVICE FOR PROCESSING PINEAPPLES

CROSS-REFERENCE TO RELATED APPLICATION

This application is a National Stage Application under 35 U.S.C. § 371(a) of PCT/NL2018/050584, filed Sep. 10, 2018. The entire contents of the foregoing application are incorporated by reference herein.

SUMMARY

The present disclosure relates to a device for processing pineapples comprising at least one carrier for carrying a pineapple to be processed, and at least one processing unit for removing the outer ends from the pineapple and/or for coring and peeling the pineapple.

Such a device for processing pineapples is known from WO 2014/184298 A1. In this known device a user is able to position a pineapple to be processed in a carrier in an input position before starting processing the pineapple by means of the processing unit. The carrier is denoted as a clamping unit in this document. Although this device works well it may be further improved to maintain and/or enhance a relative safe operation condition for people using the device.

An objective of the present disclosure is to provide an improved device for processing pineapples, in particular a device which facilitates a relative safe operation condition for people using the device.

The objective is achieved by the device for processing pineapples according to the present disclosure, in particular by the device for processing pineapples as defined in claim 1.

The device for processing pineapples comprises at least one carrier for carrying the pineapple to be processed, and at least one processing unit for removing the outer ends from the pineapple and/or for coring and peeling the pineapple. In addition, the device comprises a housing. The at least one carrier and the least one processing unit are located inside the housing of the device. Hence, access to the carrier and to the processing unit comprising for example knives for cutting the pineapple to obtain pineapple flesh, is restricted by the housing for people using the device. The housing of the device comprises an entrance providing an access to the interior of the housing. The devices are used for example in supermarkets to sell packaged (sliced) pineapple flesh that can be eaten directly. Hence, normally untrained customers use the device for processing a pineapple. By restricting the access to the carrier and the processing unit by means of the housing and the entrance, the risk that users come in contact with the carrier and the processing unit, accidentally or by reckless behaviour, can be reduced. In this way it is possible to reduce, even exclude, the risk that users injure themselves, for example as a result of contacting sharp tools of the processing unit. Restricted access to the interior of the housing is also desired from a hygienic point of view.

According to this disclosure, the device further comprises a pineapple introduction mechanism configured for automatically introducing the pineapple to be processed in the housing through the entrance in the at least one carrier inside the housing. The pineapple introduction mechanism provides a relative safe operation condition for people using the device, because it enables a user to obtain fresh pineapple flesh from a pineapple without requiring a user to put a pineapple in the carrier inside the housing. The automatic positioning of the pineapple into the carrier further provides a more user-friendly device and a device which reduces the risk of a user contacting hardware inside the housing of the device. Hence, the device not only provides a more hygienic alternative, it also helps to reduce the risk of accidents with users improperly using/operating the device.

Further, the pineapple introduction mechanism enables a user to activate the cutting processes for example by simply pushing a button or a screen or the like after which the pineapple is introduced in the carrier and processed by the processing unit to produce pineapple flesh that can be eaten directly.

In one aspect, the entrance is located above a starting position of the at least one carrier inside the housing, such that the pineapple is moveable from a first position outside the housing to a second position in the at least one carrier inside the housing under the influence of gravity. In this way the automatic introduction of the pineapple into the carrier inside the housing requires minimal or no energy, because gravity facilitates the insertion process of the pineapple into the carrier. In addition, such a position of the entrance also enables to provide a device having a more compact design, wherein the various steps to be executed only or mainly extend in a vertical direction. Compact design refers in particular to minimal length and width dimensions, such that the device occupies a minimum surface area. This is in particular advantageous if the device is installed in for example a supermarket, because the available surface area in square meters in supermarkets for such devices is often restricted from commercial perspective, i.e. each square meter can be used to sell products/articles.

In another aspect, the pineapple introduction mechanism further comprises a loading unit for loading pineapples and moving the pineapples one by one towards the entrance. This loading unit makes it possible that a user/customer of the device is not required to contact pineapples to be processed in the device. This loading task can or should be performed by an operator of the device or trained personnel of a shop/supermarket where the device is installed. Depending on customer demand the loading unit may comprise 3-25 pineapples to be stored in the loading unit for processing with the device.

The access to the loading unit can be restricted for a customer, for example by making the loading unit accessible for loading from the back side of the device and not from the front side facing customers or by means of a lock requiring a key or the like to provide access the loading unit for loading with pineapples by an operator.

The loading unit can be configured as a carousel construction able to rotate around a rotation axis, wherein pineapple holders of the carousel construction can be aligned by rotation above the entrance of the housing. Such a carousel construction is able to provide a compact loading unit and has an attractive appearance. In addition, the carousel provides an efficient and reliable pineapple introduction mechanism for introducing pineapples into the carrier. The carousel construction can be automatically stepwise rotated around a rotation axis by a motor to align in each step one of the pineapple holders with the entrance. After a pineapple passes the entrance, the motor can be automatically rotated, for example after a sensor has detected that a pineapple has passed the entrance or automatically after a support of the pineapple introduction mechanism has been activated for introducing the pineapple in the carrier.

The device further comprising a packaging unit to package pineapple flesh obtained from the processing unit into a packaging such as for example a bucket. In this way the pineapple flesh is collected and ready for transport.

Seen in a vertical direction the processing unit is located between the entrance in the housing and the packaging unit. In this way a vertical design of the functions of the device can be obtained to provide a device which occupies a minimal surface area.

The present disclosure also relates to the use of the device for processing pineapples as disclosed in this document.

The present disclosure further relates to an automatic selling system comprising a device for processing pineapples as disclosed in this document. Such an automatic selling system may comprise a loading unit for storing more than 25 pineapples to be processed by the device, for example 100 pineapples can be stored in such a system. Further, the automatic selling system comprises a payment system for paying by cash and/or by card and/or by mobile phone.

BRIEF DESCRIPTION OF THE DRAWINGS

The device for processing pineapples will now be explained in more detail with reference to an exemplary embodiment shown in the appended figures, in which.

Like parts are indicated by the same signs/numerals in the various figures.

DETAILED DESCRIPTION

Figure 1:
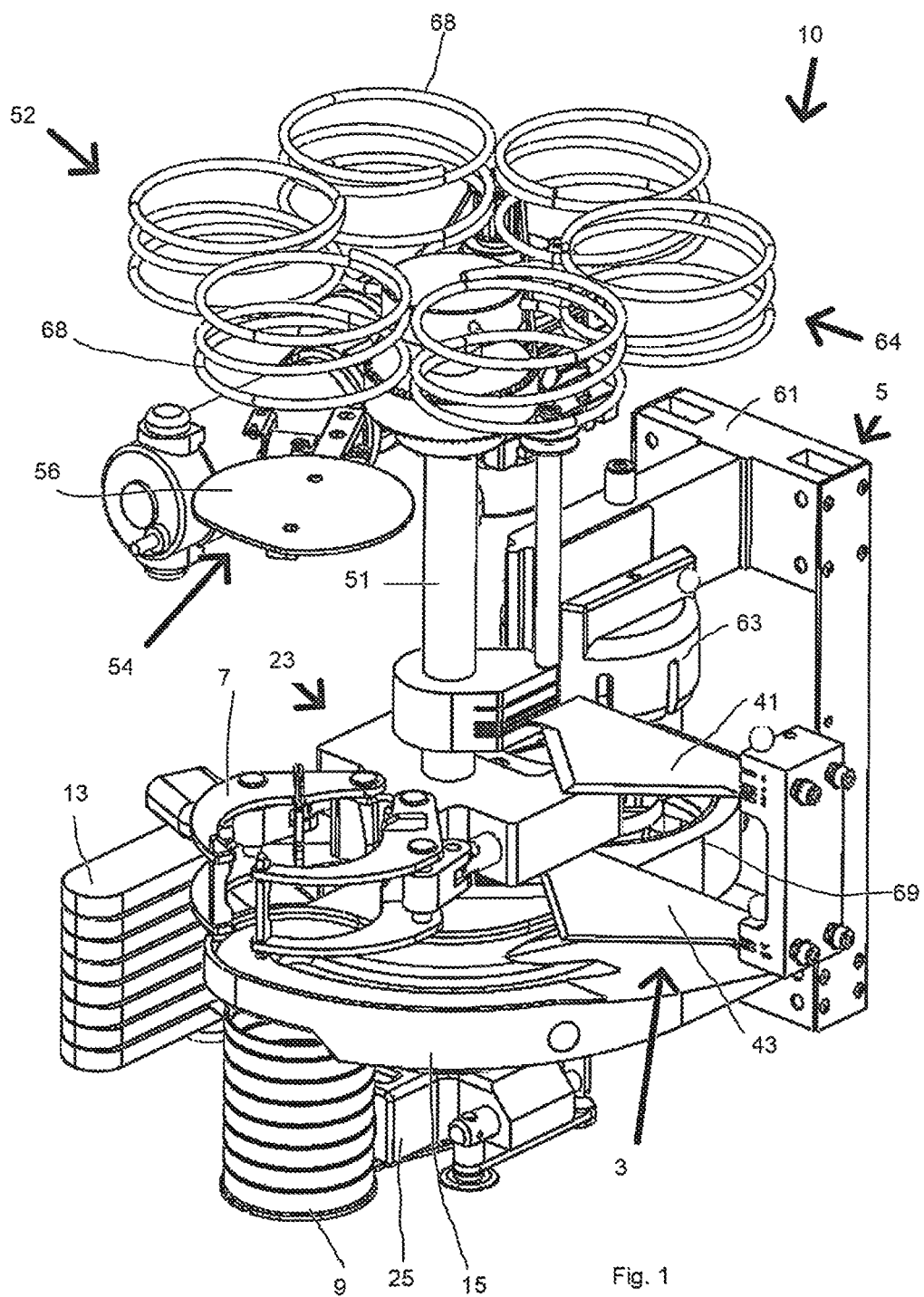
FIGS. 1 and 2 show perspective views of parts of a device for processing pineapples from different viewing angles.
Figure 2:
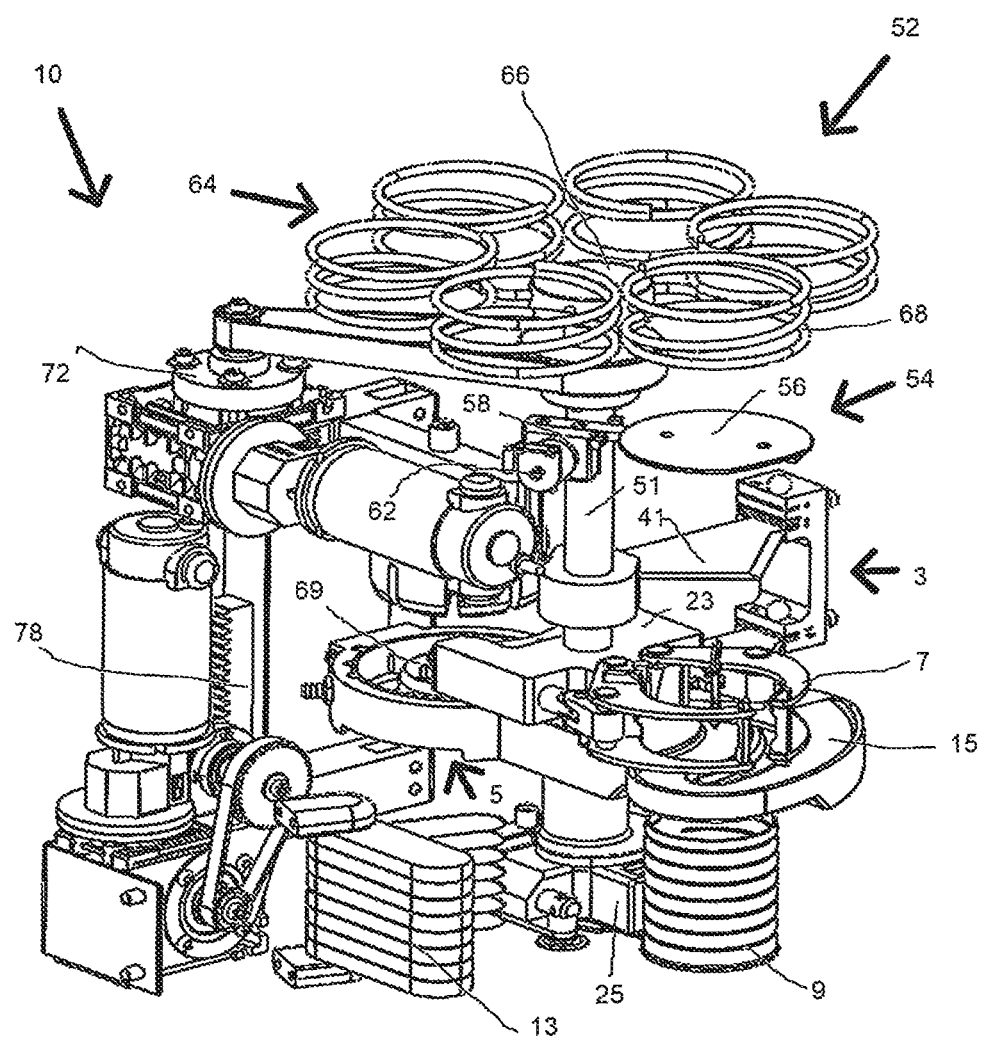
Figure 3:
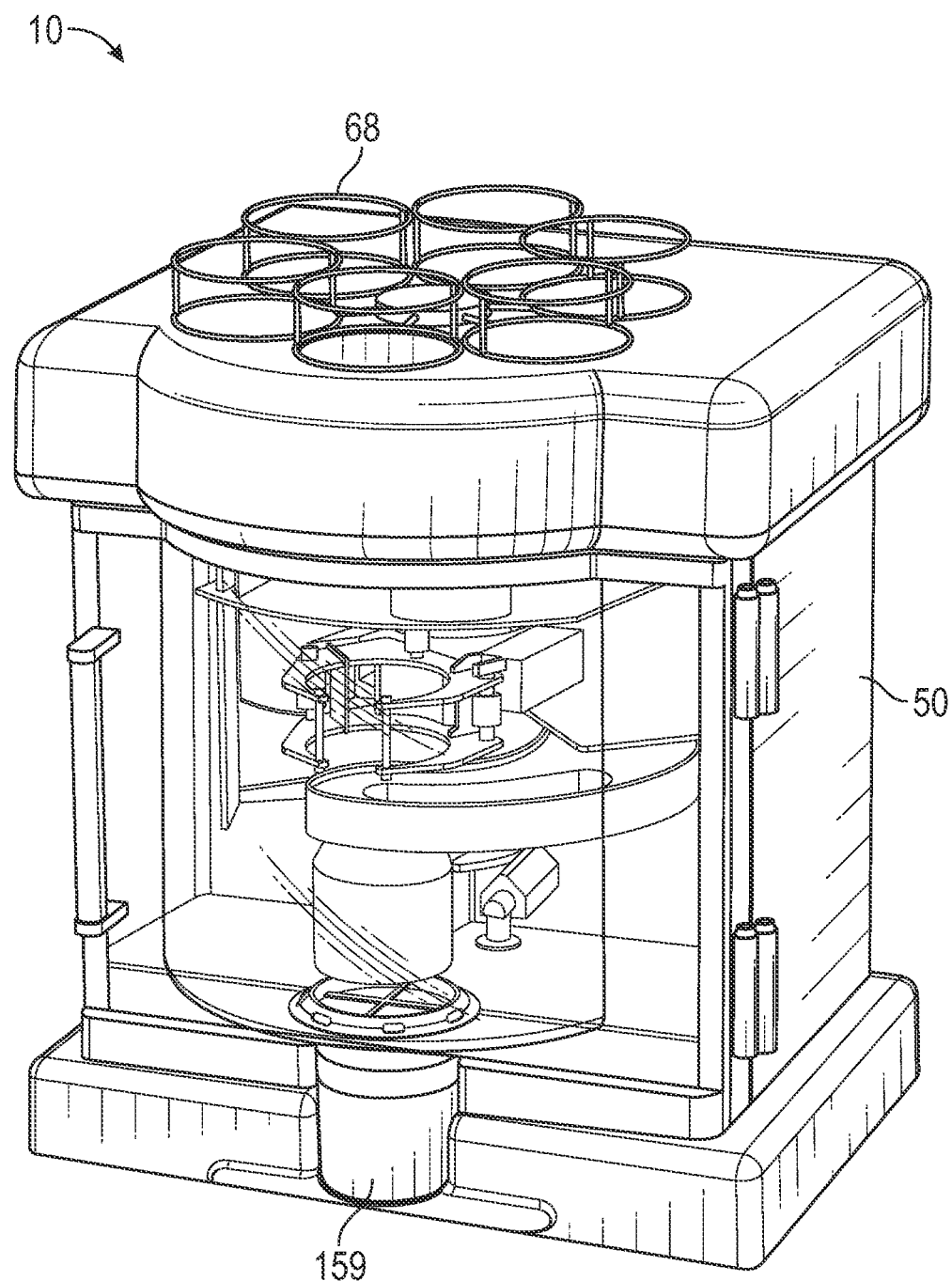
FIG. 3 shows a perspective view of a device for processing pineapples.

With respect to the device 10 shown in FIGS. 1-3 reference is made to WO 2014/184298 A1 which is incorporated by reference.

As described in WO 2014/184298 A1 the processing unit of the device 10 comprises a first processing unit 3 for removing the outer ends from the pineapple and a second processing unit 5 for simultaneously coring and peeling the pineapple. Besides the first and second processing unit 3, 5 the following parts of the device 10 are also directly involved in the pineapple processing steps: a carrier 7 denoted as clamping unit in in WO 2014/184298 and in the form of a gripping mechanism for holding the pineapple to be processed in the device, a container 9, a core removal station (not shown), a further cutting station 13, supporting means 15, 17, 19, and a guide sleeve (not shown) for transferring the pineapple flesh into a bucket. The device 10 further comprises a driving unit 23 for displacing the carrier 7 from an input position (shown in FIGS. 1 and 2) through the first processing unit 3 to the second processing unit 5. The first processing unit 3 is provided with two blades 41, 43 such that during displacement of the carrier 7 from the input position to the second processing unit 5 the outer longitudinal opposing ends from the pineapple can be simultaneously cut in a relatively efficient manner. Before and upon reaching the blades 41, 43 the pineapple in the carrier 7 is also supported by rails 15 of the device 10. The container 9 of the device 10 according to the present invention is displaceable by means of driving means 25 from a position below the second processing unit 5 to an output position (shown in FIG. 1). The container 9 and the carrier 7 are rotatable in a similar fashion around a stationary central frame part 51 of the device 10. Between the position below the second processing unit 5 and the output position (shown in FIG. 1), the container 9 may pass a third processing unit, i.e. the core removal station (not shown) to verify whether the core of the pineapple has been removed and a fourth processing unit, i.e. the further cutting station 13. The container 9 is a bottomless container, i.e. the cylindrical container 9 has two opposing open sides. The device 10 provides supporting means (not shown) to hold the pineapple flesh in the container 9 during moving and further processing the pineapple in the container 9. The supporting means for the container 9 may comprise a supporting plate and supporting rails (not shown). The supporting rails may for example end near the guide sleeve such that the pineapple flesh falls out the container 9 through the guide sleeve into a bucket 159 (FIG. 3). The second processing unit 5 has a pusher 61 comprising a pusher head 63, wherein the pusher head is vertically moveable for pushing a pineapple out of the carrier 7. In addition, the second processing unit 5 has a knife 69 with two concentric blades (not shown), i.e. an inner circular blade for coring the pineapple and an outer circular blade for skinning the pineapple. By means of the pusher 61 the pineapple without its outer ends can be vertically pushed out of the carrier 7 through the knife 69 for simultaneously coring and peeling the pineapple to produce pineapple flesh to be transferred to the container 9 positioned below the knife 69. In this position, the container 9 and the supporting plate are able to catch and hold the pineapple flesh produced in the second processing unit 5. In the output position of the container 9 the pineapple flesh will fall under influence of gravity into the bucket 159 (FIG. 3). After closing the bucket, the pineapple flesh is ready to be sold.

The device 10 for processing pineapples comprises the carrier 7 for carrying the pineapple to be processed, and the processing unit 3, 5 for removing the outer ends from the pineapple and/or for coring and peeling the pineapple. In addition, this disclosure teaches that the device comprises a housing 50 as shown in FIG. 3 which for the sake of clarity is not shown in FIGS. 1 and 2 and that the carrier 7 and the processing unit are located inside the housing 50 of the device 10. Hence, access to the carrier 7 and to the processing unit 3, 5 comprising the knives 41, 43, 69 for cutting the pineapple to obtain pineapple flesh, is restricted by the housing 50 for people using the device 10. The housing of the device 10 comprises a pineapple entrance 54 in the top section of the housing 50 providing an access for a pineapple to be processed to the interior of the housing 60. According to this disclosure, the device 10 further comprises a pineapple introduction mechanism 52 configured for automatically introducing the pineapple to be processed through the pineapple entrance of the housing 50 in the carrier inside the housing. The pineapple introduction mechanism 52 provides a relative safe operation condition for people using the device 10, because it enables a user to obtain fresh pineapple flesh from a pineapple without requiring a user to put a pineapple in the carrier 7 inside the housing 50. The automatic positioning of the pineapple into the carrier 7 further provides a more user-friendly device and a device which reduces the risk of a user contacting hardware inside the housing of the device. Hence, the device not only provides a more hygienic alternative, it also helps to reduce the risk of accidents with users improperly operating the device. Further, the pineapple introduction mechanism 50 enables a user to activate the cutting processes of the pineapple for example by simply pushing a button or a screen or the like (not shown) after which the pineapple is introduced in the carrier 7 and processed by the processing unit 3, 5 to produce pineapple flesh that can be eaten directly.

The entrance 54 is located above a starting position (shown in FIGS. 1 and 2) of the at least one carrier 7 inside the housing 50, such that the pineapple is moveable from a first position at least partly outside the housing to a second position in the at least one carrier 7 inside the housing 50 under the influence of gravity. The carrier 7 is moveable from an input position (shown in FIGS. 1 and 2) for introduction of a pineapple into the carrier to an output position in the second processing unit 5.

The pineapple introduction mechanism 52 comprises a support 56 moveable between a first position (shown in FIGS. 1 and 2) supporting the pineapple at least partly located outside the housing and a second position (not shown) for automatically introducing the pineapple to be processed in the at least one carrier inside the housing, and vice versa.

The pineapple introduction mechanism 52 comprises an electromagnet 58 for activating the movement of the support 56 from the first position to the second position. The support 56 is held closed by the electromagnet 56. If the pineapple should be introduced into the carrier, the electromagnet 58 is de-energized, and the support 56 will swing downwards around a pivot axis 62 under influence of gravity, i.e. the weight of pineapple resting on the support 56. The support is configured as a swing construction, i.e. after swinging downwards the support 56 will swing back to the first position as shown in FIGS. 1 and 2. It is possible to use a spring or the like to facilitate that the support 56 swings back to the first position. After swinging downwards of the support 56, the electromagnet 58 is again energized and the support 56 will be captured and held in the first position by magnetic force. Using an electromagnet 56 provides a reliable pineapple introduction mechanism 52 with minimal maintenance.

As can be seen in FIGS. 1 and 2 the entrance 54 of the housing 50 is closed at least for a pineapple in the first position of the support 56. By positioning the support 56 somewhat lowered in the top section of the device 10, access for a user to the carrier 7 and the processing units 3, 5 through the pineapple entrance 54 is made almost impossible.

The pineapple introduction mechanism 52 of the device 10 further comprises a loading unit 64 for loading pineapples and moving the pineapples one by one towards the entrance 54. The loading unit 64 is configured as a carousel construction able to rotate around a rotation axis 66, wherein pineapple holders 68 of the carousel construction can be aligned by rotation around the rotation axis 66 above the entrance 54 to the interior of the housing 50 of the device 10. The carousel construction of the pineapple loading unit 64 is automatically stepwise rotated around the rotation axis 66 by a motor 72 to align in each step one of the pineapple holders 68 with the entrance 54. The rotation axis 66 coincides with the rotation axis for moving the carrier 7 and the container 9 from an initial position as shown in FIGS. 1 and 2 towards the second processing unit 5 and vice versa.

The pineapples holders are configured to hold the pineapple in an upright position therein. In this way, the pineapple will fall under influence of gravity into the carrier 7 in the desired orientation. The orientation of the pineapple is then further optimized by means of the grippers of the carrier 7 that move towards each other to clamp and hold the pineapple in the desired orientation for processing by the processing unit.

As shown in FIG. 3, the dimensions of the device 10 are relatively small, in particular the length and width dimensions are small. This is possible, because as seen in a vertical direction the functions of the device are configured in a vertical direction, i.e. the processing unit 3, 5 is located between the entrance 54 into the interior of the housing 50 and the packaging unit. By using the carousel construction in the loading unit, another function is integrated in a vertical configuration of the device 10.

The height of the device is the largest dimension, but even the height dimension is smaller than two times the length or width dimension.

A bottom of the device 10 can be positioned on an external support (not shown), for example a table or the like. The front of the device may be partially transparent such that the user is able to see the cutting processes of the pineapple inside the device. As shown in FIG. 3, the front of the device comprises a door with a window. This door can be locked such that customer cannot access the interior of the housing and the interior is only accessible for example for cleaning purposes by an operator of the device.

The pusher 61 of the second processing unit is driven by a linear actuator which comprises a rack and pinion 78. The rack and pinion 78 provide a reliable and strong mechanism to drive the pusher to push the pineapple through the knife 69.

The pineapple introduction mechanism may also comprises an actuator (not shown) for moving the support from the first position to the second position and/or vice versa. The actuator moves the support such that the pineapple is introduced in the carrier. The actuator converts energy into a motion or force and can be powered by pressurized fluid or air, as well as electricity.

The position, dimensions and orientation of the knives 41, 43, 69 and/or the distance between the knives 41, 43 can be adjusted dependent on what type of pineapple is being processed in the device 10. This adjustment can be done automatically by changing the settings of the device 10 by an operator.

The invention claimed is:

1. A device for processing pineapples comprising:
   at least one carrier for carrying a pineapple to be processed, and
   at least one processing unit for removing outer ends from the pineapple, and/or for coring and peeling the pineapple,
   wherein the at least one carrier and the least one processing unit are located inside a housing of the device, the housing comprises an entrance, wherein the device further comprises a pineapple introduction mechanism configured for automatically introducing the pineapple to be processed in the housing through the entrance in the at least one carrier inside the housing,
   wherein the pineapple introduction mechanism includes:
     a support movable between a first position supporting the pineapple outside the housing and a second position for automatically introducing the pineapple to be processed in the at least one carrier inside the housing, and vice versa, and
     a loading unit for loading pineapples and moving the pineapples one by one towards the entrance which is closed at least for a pineapple in the first position of the support.

2. The device according to claim 1, wherein the entrance is located above a starting position of the at least one carrier inside the housing, such that the pineapple is moveable from a first position outside the housing to a second position in the at least one carrier inside the housing under influence of gravity.

3. The device according to claim 1, wherein in the first position of the support the entrance of the housing is closed at least for a pineapple.

4. The device according to claim 1, wherein the pineapple introduction mechanism comprises an actuator for moving the support from the first position to the second position and/or vice versa.

5. The device according to claim 1, wherein the pineapple introduction mechanism comprises an electromagnet for moving the support from the first position to the second position.

6. The device according to claim 5, wherein the support is configured as a swing construction.

7. The device according to claim 1, wherein the loading unit is configured as a carousel construction able to rotate around a rotation axis, wherein pineapple holders of the carousel construction can be aligned by rotation above the entrance of the housing.

8. The device according to claim 7, wherein the carousel construction is automatically stepwise rotated around a rotation axis by a motor to align in each step one of the pineapple holders with the entrance.

9. The device according to claim 7, wherein each of the pineapples holders is configured to hold the pineapple in an upright position therein.

10. The device according to claim 1, wherein a bottom side of the device can be positioned on an external support.

11. The device according to claim 1, wherein the carrier is moveable from an input position for introduction of a pineapple into the carrier to an output position in the processing unit.

12. The device according claim 1, wherein the least one processing unit comprises a first processing unit for removing the outer ends from the pineapple carried by the carrier, and a second processing unit comprising a pusher and a knife with two concentric blades, wherein the carrier is rotatable around a rotation axis for moving the carrier from the first processing unit to the second processing unit.

13. The device according to claim 12, wherein by use of the pusher, the pineapple without its outer ends can be substantially vertically pushed out of the carrier through the knife for simultaneously coring and peeling the pineapple, wherein the pusher is driven by a linear actuator.

14. The device according to claim 1, wherein the device further comprising a packaging unit to package pineapple flesh obtained from the processing unit into a packaging such as for example a bucket.

15. The device according to claim 14, wherein seen in a vertical direction the processing unit is located between the entrance in the housing and the packaging unit.

16. Use of the device according to claim 1 for processing pineapples.

17. Automatic selling system comprising:
a housing including an entrance;
at least one carrier disposed inside the housing for carrying a pineapple to be processed;
at least one processing unit disposed inside the housing for removing outer ends from the pineapple, and/or for coring and peeling the pineapple; and
a pineapple introduction mechanism configured for automatically introducing the pineapple to be processed in the housing through the entrance in the at least one carrier inside the housing,
wherein the pineapple introduction mechanism further includes an electromagnet for moving the support from the first position to the second position.

18. The device according to claim 1, wherein the support is movable under influence of gravity.

19. The device according claim 12, wherein the carrier is further movable from an input position for introduction of the pineapple into the carrier to an output position in the second processing unit.

20. The device according to claim 13, wherein the linear actuator includes a rack and pinion.

* * * * *